United States Patent [19]

Congdon et al.

[11] Patent Number: 5,143,690
[45] Date of Patent: Sep. 1, 1992

[54] FUEL-ASSEMBLY INVERSION FOR DUAL-PHASE NUCLEAR REACTORS

[75] Inventors: Steven P. Congdon, Los Gatos; Russell M. Fawcett, San Jose, both of Calif.

[73] Assignee: General Electric Company, San Jose, Calif.

[21] Appl. No.: 709,534

[22] Filed: Jun. 3, 1991

Related U.S. Application Data

[63] Continuation-in-part of Ser. No. 553,073, Jul. 10, 1990.

[51] Int. Cl.$^5$ .............................................. G21C 19/00
[52] U.S. Cl. ....................................... 376/267; 376/435
[58] Field of Search ............... 376/428, 434, 267, 348, 376/435

[56] References Cited

U.S. PATENT DOCUMENTS 4,631,166  12/1986  Camden ............................... 376/267
4,655,995  4/1987  Freeman et al. .................... 376/267
4,767,595  8/1988  Wolters et al. ...................... 376/267

Primary Examiner—Brooks H. Hunt
Assistant Examiner—Frederick H. Voss
Attorney, Agent, or Firm—Robert R. Schroeder

[57] ABSTRACT

Fuel assemblies of a boiling-water nuclear reactor are inverted during refueling methods. Assemblies burned in a first orientation are subjected to greater burnup near their bottoms and greater conversion of fertile fuel to fissile fuel near their tops. Inverting the assemblies promotes burnup of the actinide products from the conversion of the last cycle. Thus, the procedure greater energy production efficiency and reduced actinide radioactive waste are achieved. One inverted fuel assemblies can be removed for disposal. Alternatively, they can be reinverted to burnup actinide fissile fuel generated at the bottom (while it was downstream of the top) during the second operating cycle. Further inversions are provided for, but the major gains occur during the first and second inversions.

2 Claims, 4 Drawing Sheets

FUEL-ASSEMBLY INVERSION FOR DUAL-PHASE NUCLEAR REACTORS

This is a continuation-in-part of pending U.S. patent application Ser. No. 07/553,073, filed Jul. 10, 1990.

BACKGROUND OF THE INVENTION

This invention relates to nuclear reactors and, more particularly, to fuel arrangements in a reactor core. A major objective of the present invention is to provide for more thorough fuel burnups to enhance fuel utilization and minimize active waste products.

Fission reactors rely on fissioning of fissile atoms such as uranium isotopes (U233, U235) and plutonium isotopes (Pu239, Pu241). Upon absorption of a neutron, a fissile atom can disintegrate, yielding atoms of lower atomic weight and high kinetic energy along with several high-energy neutrons. The kinetic energy of the fission products is quickly dissipated as heat, which is the primary energy product of nuclear reactors. Some of the neutrons released during disintegration can be absorbed by other fissile atoms, causing a chain reaction of disintegration and heat generation. The fissile atoms in nuclear reactors are arranged so that the chain reaction can be self-sustaining.

To facilitate handling, fissile fuel is typically maintained in modular units. These units can be assemblies of vertically extending fuel rods. Each rod has a cladding which encloses a stack of fissile fuel pellets. Generally, each rod includes a space or "plenum" for accumulating gaseous byproducts of fission reactions which might otherwise unacceptably pressurize the rod and lead to its rupture. The assemblies are arranged in a two-dimensional array in the reactor. Neutron-absorbing control rods are inserted between or within fuel bundles to control the reactivity of the core. The reactivity of the core can be adjusted by incremental insertions and withdrawals of the control rods.

Both economic and safety considerations favor improved fuel utilization, which can mean less frequent refuelings and less exposure to radiation from a reactor interior. In addition, improved fuel utilization generally implies more complete fuel "burnups".

Variations in neutron flux density, which occur along the length of a bundle, make it difficult to achieve complete burnups. For example, fuel near the top or bottom of a fuel bundle is subjected to less neutron flux than is fuel located midway up a fuel bundle. These axial variations are not effectively addressed by radial redistribution of fuel elements.

In addition to the variations in neutron flux density, variations in spectral distribution affect burnup. Initially, neutrons released during fissioning move too quickly and have too high an energy to readily induce the further fissioning required to sustain a chain reaction. These high energy neutrons are known as "fast" neutrons. Slower neutrons, referred to as "thermal neutrons", most readily induce fission.

Dual-phase reactors store heat generated by the core primarily in the form a phase conversion of a heat transfer medium from a liquid phase to a vapor phase. The vapor phase can used to physically transfer stored heat to a turbine and generator, which are driven to produce electricity. Condensate from the turbine can be returned to the reactor, merging with recirculating liquid for further heat transfer and cooling. The primary example of a dual-phase reactor is a boiling-water reactor (BWR). Dual-phase reactors are contrasted with single-phase reactors, which store energy primarily in the form of elevated temperatures of a liquid heat-transfer medium, such as liquid metal. The following discussion relating to BWRs is readily generalizable to other forms of dual-phase reactors.

In BWRs, thermal neutrons are formerly fast neutrons that have been slowed primarily through collisions with hydrogen atoms in the water used as the heat transfer medium. Between the energy levels of thermal and fast neutrons are "epi-thermal" neutrons. Epithermal neutrons exceed the desired energy for inducing fission but promote resonance absorption by many actinide series isotopes, converting some "fertile" isotopes to "fissile" (fissionable) isotopes. For example, epithermal neutrons are effective at converting fertile U238 to fissile Pu239. Within a core, the percentages of thermal, epithermal, and fast neutrons vary over the axial extent of the core.

Axial variations in neutron spectra are caused in part by variations in the density or void fraction of the water flowing up the core. In a boiling-water reactor (BWR), water entering the bottom of a core is essentially completely in the liquid phase. Water flowing up through the core boils so most of the volume of water exiting the top of the core is in the vapor phase, i.e., steam. Steam is less effective than liquid water as a neutron moderator due to the lower density of the vapor phase. Therefore, from the point of view of neutron moderation, core volumes occupied by steam are considered "voids"; the amount of steam at any spatial region in the core can be characterized by a "void fraction". Within a fuel bundle, the void fraction can vary from about zero at the base to about 0.7 near the top.

Continuing the example for the BWR, near the bottom of a fuel bundle, neutron generation and density are relatively low, but the percentage of thermal neutrons is high because of the moderation provided by the low void fraction water at that level. Higher up, neutron density reaches its maximum, while void fraction continues to climb. Thus, the density of thermal neutrons peaks somewhere near the lower-middle level of the bundle. Above this level, neutron density remains roughly stable while the percentages of epithermal and fast neutrons increase. Near the top of the bundle, neutron density decreases across the spectrum since there are no neutrons being generated just above the top of the bundle.

The inhomogeneities induced by this spectral distribution can cause a variety of related problems. Focusing on the upper-middle section, problems of inadequate burnup and increased production of high-level waste are of concern. Since the upper-middle section has a relatively low percentage of thermal neutrons, a higher concentration of fissile fuel is sometimes used to support a chain reaction. If the fuel bundle has a uniform fuel distribution, this section could fall below criticality (the level required to sustain a chain reaction) before the other bundle sections. The fuel bundle would have to be replaced long before the fissile fuel in all sections of the bundle were depleted, wasting fuel. While it is possible to disassemble a spent fuel bundle to recover unspent fuel, this is much more expensive and complicated than using fuel while it is in the bundle.

The problem with waste disposal is further aggravated at this upper-middle section since the relatively high level of epithermal neutrons results in increased production of actinide-series elements such as neptunium, plutonium, americium, and curium, which end up as relatively long half life, high-level waste. For example, about 1% of the U238 in a fuel bundle is converted to plutonium, mainly Pu239, along with Pu240, Pu241 and Pu242. Pu239 and Pu240 have long halflives so that considerable expense is incurred if these isotopes remain unburned and long term protection and storage are required.

One method of dealing with axial spectral variations is using a control rod. For the BWR, control rods typically extend into the core from below and contain neutron-absorbing material which robs the adjacent fuel of thermal neutrons which would otherwise be available for fissioning. Thus, control rods can be used to modify the distribution of thermal neutrons over axial position to achieve more complete burnups. However, control rods provide only a gross level of control over spectral density.

More precise compensation for spectral variations can be implemented using enrichment variation and burnable poisons. Enrichment variation using, for example, U235 enriched uranium, can be used near the top of a fuel bundle to partially compensate for a localized lack of thermal neutrons. Similarly, burnable poisons such as gadolinium oxide ($Gd_2O_3$), can balance the exposure of bundle sections receiving a high thermal neutron flux. Over time, the burnable poisons are converted to isotopes which are not poisons so that more thermal neutrons become available for fissioning as the amount of fissile material decreases. In this way, fissioning can remain more constant over time in a section of the fuel bundle. By varying the amount of enrichment and burnable poisons by axial position along a bundle, longer and more complete burnups can be achieved. In addition, the enrichment and poison profiles can be varied by radial position to compensate for radial variations in thermal neutron density.

Fuel management using control rods, selective enrichment and burnable poisons can be used to control the void fraction within the core as a function of time. Controlling the void fraction over time, in turn, results in control over the neutron flux profile. Thus, early in the life cycle of a fuel element, a large void fraction can be implemented, resulting in high heat generation at the bottom of a fuel bundle, while conversion of fertile fuel is facilitated over most of the fuel bundle length. Over time, the void fraction can be reduced, so that the portion of the fuel bundle subjected to thermal neutrons is increased, promoting further burnup at successively higher levels within the bundle that have been enriched by the earlier conversion.

Imposing a progressively diminishing void fraction permits more complete burnups. However, it requires non-uniform power distributions. Non-uniform power distributions require lower reactor outputs, since peak temperatures must remain within limits to prevent excessive outgassing of fission products within fuel rods. Furthermore, non-uniform power distributions can induce additional thermal stresses along fuel rods; these stresses must be managed by limiting reactor output power. Moreover, void fractions can be controllably varied by adjusting pumping rates and thus coolant flow. The ability to control void fractions by increasing coolant flow is much more limited in some types of reactors. For example, natural-circulation boiling-water reactors rely on convection rather than pumps to promote circulation.

Taken together, the use of control rods, control of void fraction over time, radial positional exchange of fuel assemblies, selective enrichment and distribution of burnable poisons still leave problems with axial variations in burn rates and neutron spectra. Furthermore, none of these employed methods effectively addresses the problem of the high level of fissile material produced and left in the upper-middle sections of the bundle due to the high level of epithermal neutrons and the low level of thermal neutrons. What is needed is a system that deals more effectively with axial spectral variations in neutron flux so that higher fuel burnups are provided and so that high-level waste is minimized.

SUMMARY OF THE INVENTION

In accordance with the present invention, fuel assemblies in a dual-phase nuclear reactor are inverted between operational cycles to provide for more uniform heat distribution in the core and more complete burnup during the lifetime of a fuel assembly. A fuel assembly can be inverted once to allow more complete burnup of fissile fuel created by conversion of fertile fuel near what was the top of a fuel assembly. In one realization of the present invention, a fuel assembly is inverted exactly once before retirement, while in another, exactly two inversions are implemented to allow more complete burnup of conversion products generated during the second cycle. Greater number of inversions are also provided for.

Fuel assemblies can be sufficiently symmetric to permit installation in the core in both the intial and the inverted position. Means for supporting the bundle in the core and for manipulating the bundle in and out of the core are adapted to this symmetric fuel assembly. This symmetry is 180° rotational symmetry about a line perpendicular to the major axis of the fuel assembly. In either the initial or inverted position, the major axis of the fuel assembly is generally codirectional with the direction of flow of the heat transfer fluid.

The symmetry need not be complete. Asymmetric fuel distributions are provided for within fuel rods of a fuel assembly. In addition, mechanical asymmetries within a fuel rod are provided for. For example, while outgas plenums can be arranged at both ends of a fuel rod, only one of these ends needs a spring to provide the required level of fuel compression.

Preparatory steps include assembly of fuel rods and a fuel assembly. During a first operational cycle, a "heads up" fuel bundle is exposed to more thermal neutrons near its foot and more fast neutrons near its head. Thus, more heat tends to be generated at the foot and more fissile fuel tends to be generated near the head. Upon inversion of the fuel assembly, the fissile actinide series fuel is subject to the greater thermal neutron flux, and thus burns more completely. In the meantime, further conversion of fertile fuel occurs at the bundle foot, which is in the upper, fast-neutron, region of the core. A second inversion allows this newer fertile fuel to be burned.

While further inversions are provided for, two inversions insures that substantial quantities of conversion products are burned at both ends of each fuel bundle. By appropriate distributions of fuel fertile material, and burnable poisons in the fuel rods, fuel assemblies can be designed for either one or two inversions. The optimal number of inversions can depend also on the radial position of a fuel assembly. Different fuel rod compositions and different numbers of inversions can be applied across a core. Furthermore, an inverted fuel assembly can be installed in a position other than its original position. Thus, the present invention provides considerable flexibility in fuel management.

The present invention provides a more uniform time-averaged neutron flux distribution over the length of a fuel bundle. Accordingly, more complete burnup is possible. In particular, inverting fuel assemblies promotes more complete burnup of actinide conversion products that would otherwise remain out of the high thermal flux regions toward the bottom of the core. Thus, greater efficiency and less problematic waste disposal are advantages provided by the present invention. Both of these advantages result in considerable cost savings. Increased efficiency results in greater amortization of the costs of a fuel assembly; more thorough burnup, especially of the actinide series isotopes, reduces the extent and term required for waste disposal.

The more uniform power distribution permits a greater total power for a given constraint on spatial power peaks. Such constraints are required to prevent fuel rods from being damaged by excessive local temperatures. In addition, lower thermal peaks can be maintained, reducing stress on fuel rod claddings, enhancing their reliability. In addition, limiting thermal peaks minimizes outgassing of fission products, allowing smaller plenums to be used. Smaller plenums result in shorter fuel rods, shorter fuel assemblies; and a smaller reactor overall.

Since the present invention is compatible with more uniform spatial distributions there is less need to manipulate factors such as void fraction, fertile fuel distribution, and burnable poison distribution to control burnup. Thus, the present invention removes the need to compromise other design goals in order to achieve longer fuel burnups. The invention is particularly useful in the context of natural-circulation reactors, that have limited flexibility in terms of neutron spectrum engineering.

For example, instead of implementing a variable void fraction to improve time-averaged neutron flux distribution, void fraction can be optimized for core stability. Stable thermal hydraulic operation, that is, the propensity to damp stochastic disturbances in flow and void fraction, is promoted more effectively where there is a liquid water phase adjacent to the fuel rod plenums than where there is a combination of liquid and vapor phases. Relative to one-level cores in which all plenums are near the top, the present invention provides greater stability since at least part of the plenum volume is at the core entrance where there are no steam voids and the overall two-phase flow pressure drop is reduced.

While time-averaged uniformity is advantageous, the present invention also provides a greater range of neutron flux for a given vertical location in a fuel bundle. This greater range provides for greater conversion of fertile fuel to fissile fuel in one cycle and then greater burn up of the converted fuel in a later cycle. These and other features and advantages of the present invention are apparent in the following description with references to the drawings below.

DESCRIPTION OF THE PREFERRED EMBODIMENTS

Figure 1:
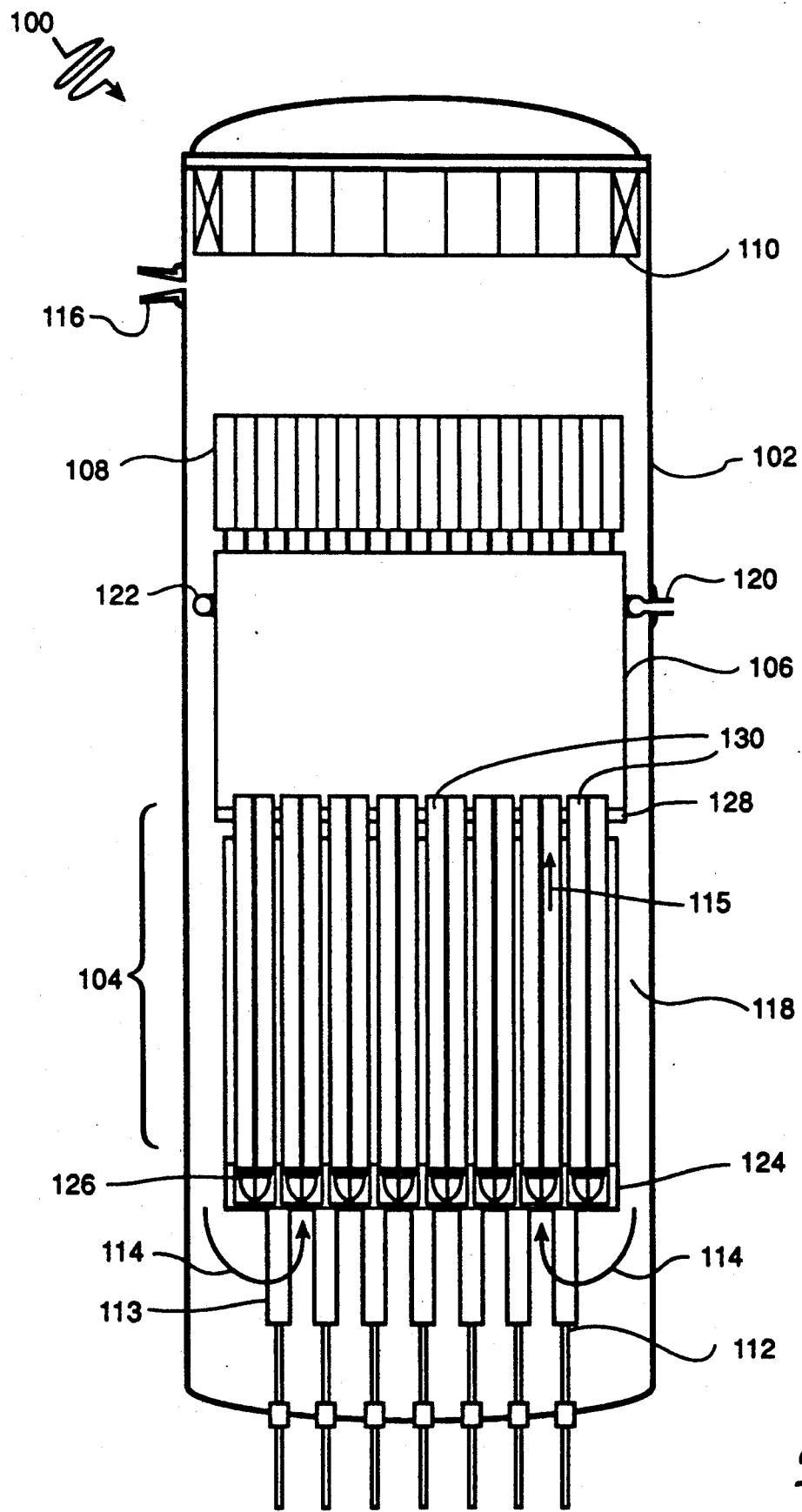
FIG. 1 is a schematic elevational sectional view of a boiling-water reactor in relation to which a method of the present invention is practiced.

In accordance with the present invention, a natural-circulation boiling-water reactor 100 comprises a vessel 102, a core 104, a chimney 106, a steam separator 108, and a dryer 110. Control rod drive housings 112 extend through the bottom of vessel 102 and support control rod guide tubes 113. Control rod guide tubes 113 extend to the bottom of core 104 so that control blades therein can be inserted into and retracted from core 104 to control its power output.

Water flows, as indicated by arrows 114, into core 104 from below. This subcooled water is boiled within core 104 to yield a water/steam mixture which rises through core 104 and chimney 106, as indicated by arrow 115. Steam separator 108 helps separate steam from water, and the released steam exits through a steam exit 116 near the top of vessel 102. Before exiting, any remaining water entrained in the steam is removed by dryer 110. Water is returned down peripheral downcomer 118 by the force of the driving steam head provided by chimney 106. Feedwater enters vessel 102 through a feedwater inlet nozzle 120 and feedwater sparger 122 to replenish and to help cool the recirculating water in downcomer 118.

Figure 2:
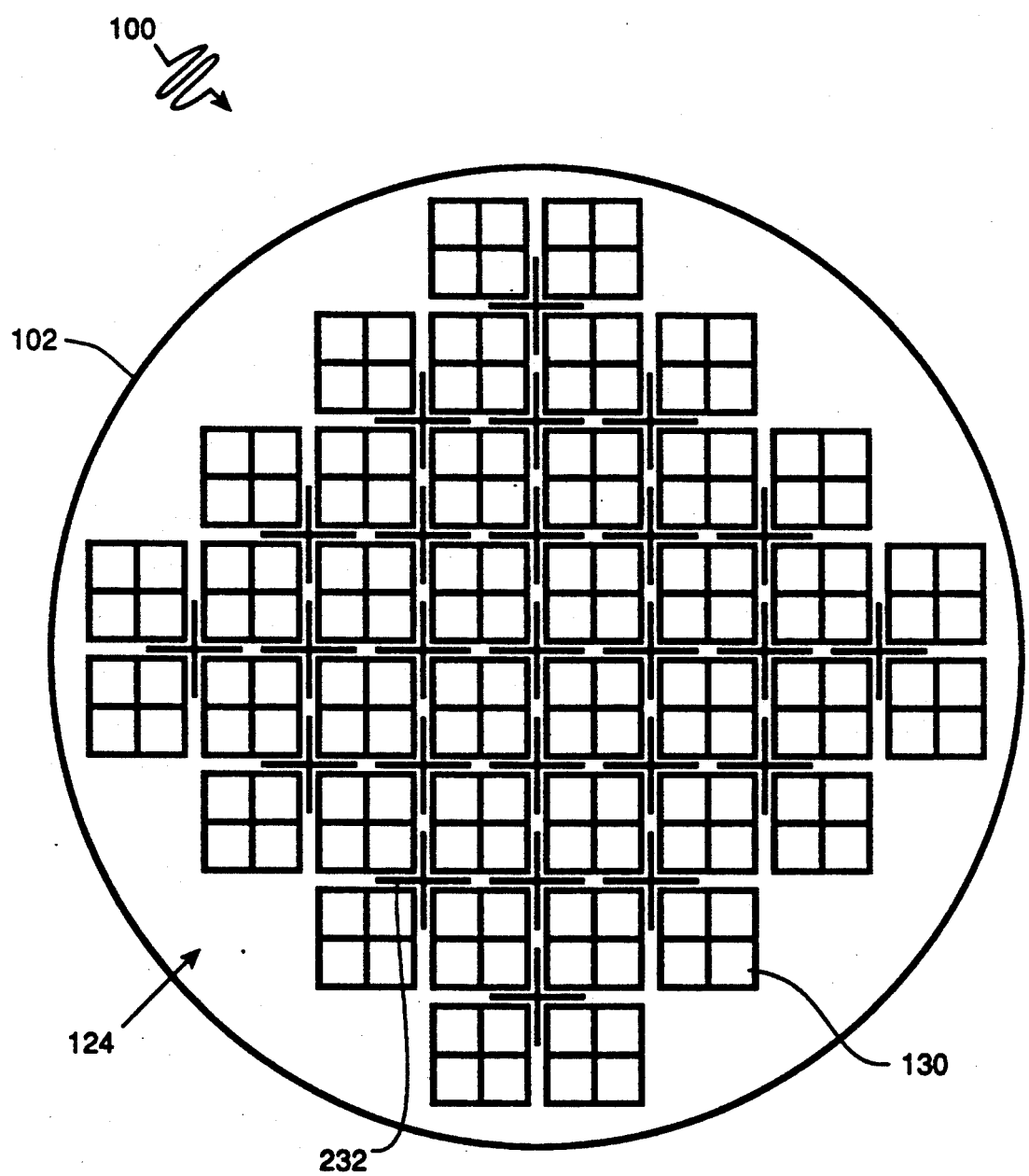
FIG. 2 is a schematic upper sectional view of the reactor of FIG. 1.

Core 104 is bounded from below by a core support plate 124, along with associated orificed support stubs 126, and bounded from above by a top guide 128. These structures support and aid in the installation of fuel assemblies 130 that constitute core 104. Fuel assemblies 130 are arranged in a two-dimensional array, as shown in FIG. 2. Spaces are left between groups of four fuel assemblies for control rods 232 with cruciform cross sections to move vertically to regulate power output.

Figure 3:
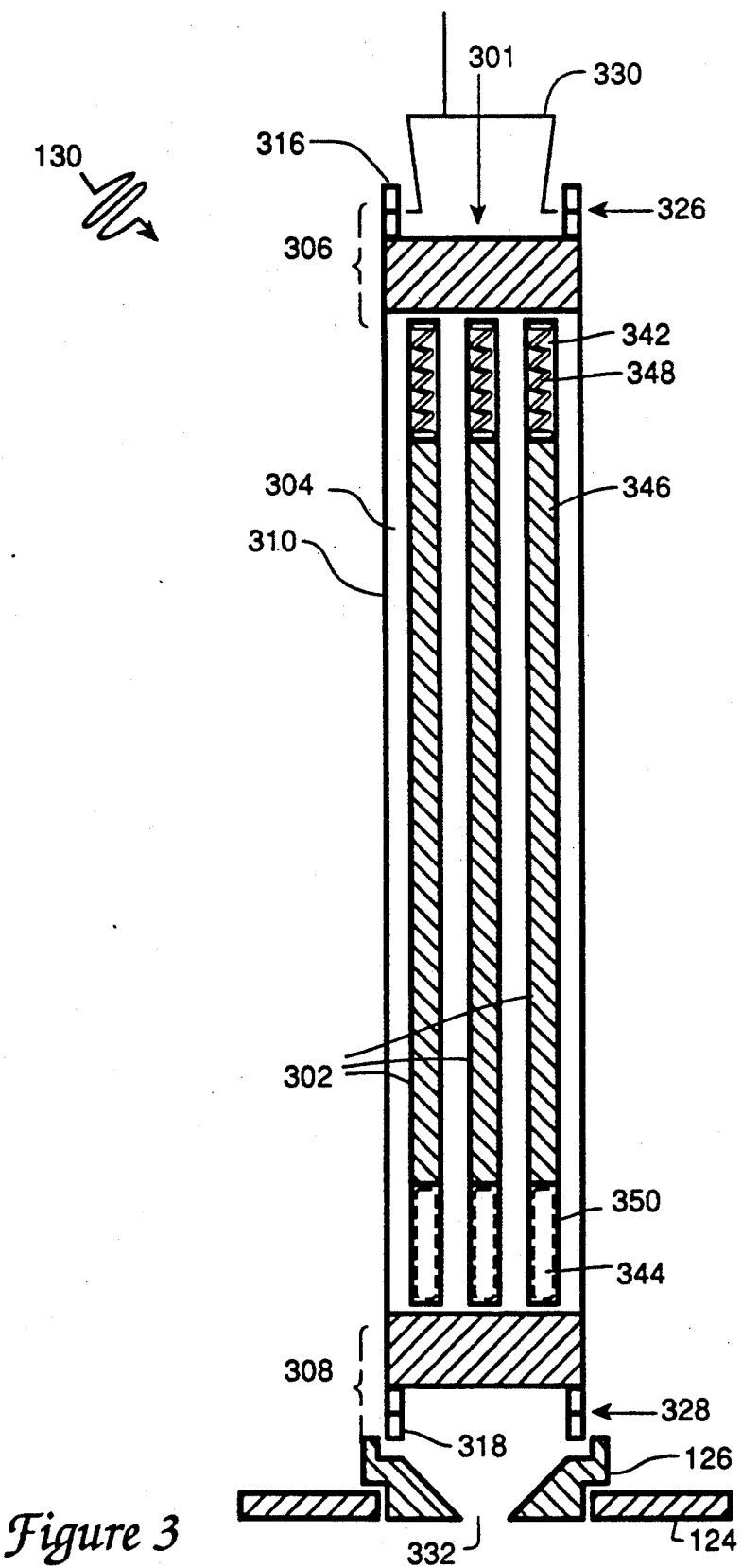
FIG. 3 is a schematic elevational view of a fuel fuel assembly used in the reactor of FIG. 1.
Figure 4:
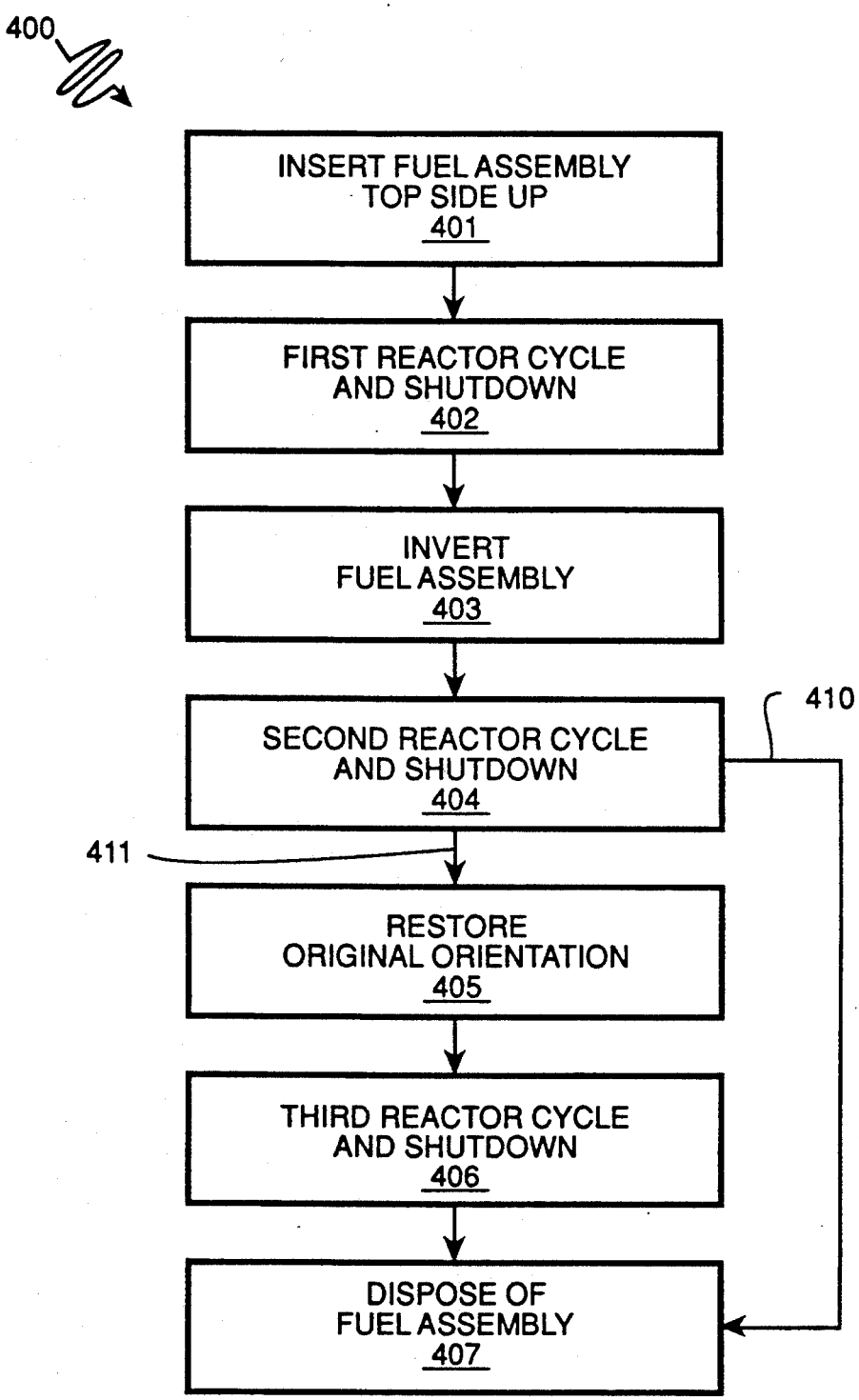
FIG. 4 is a flow chart of a fuel management method practiced in relation to the reactor of FIG. 1.

As schematically indicated in FIG. 3, each fuel bundle 130 comprises a channel wall 310 and a fuel bundle 301. Fuel bundle 301 comprises a top tie plate 306, a bottom tie plate 308, and fuel rods 302. Channel wall 310 defines a coolant channel 304 through which coolant for rods 302 can flow. Fuel rods 302 are arranged in a 15×15 array within channel 304 of bundle 130. Channel 304 has a square cross section, which defines the square cross section of fuel assembly 130 (as shown in FIG. 2). Not all positions within the array are filled with fuel rods 302. Some positions are left open to provide additional coolant throughput and to optimize the fission characteristics of bundle 301.

Channel wall 310 extends between tie plates 306 and 308. wall 310 defines a channel for coolant to flow through. Tie plates 306 and 308 maintain fuel rods 302 in their respective array positions, yet allow for vertical expansion, which occurs as temperatures rise. Tie plates 306 and 308 have respective ridges 316 and 318. These ridges are designed to seat securely on support stub 126. Thus, assembly 130 can be supported in either an inverted orientation (in which case ridge 316 engages support stub 126) or an uninverted orientation (in which case, ridge 318 engages support stub 126, as shown).

Each tie plate 306 and 308 includes respective pairs of radial holes 326 and 328, for admitting prongs of a refueling tool 330, shown about to engage holes 326 in FIG. 3. Refueling tool 330 aids in the insertion, removal, movement and inversion of fuel assembly 130.

Refueling tool 330 is inserted from above while reactor 100 is shut down and the top of vessel 102 is removed. Thus, both tie plates 306 and 308 provide for both seating on support stub 126 and for manipulation by tool 300. This achieves a measure of symmetry required for the inversions of the present invention. The symmetry corresponding to bundle inversion is a 180° rotational symmetry about a line perpendicular to the vertical axis of bundle 130.

It is generally desirable to have a greater pressure drop at the downstream end of a fuel bundle than at the upstream end. To this end, prior art fuel bundles including a constrictive orifice at their base. However, if built into the fuel bundle, such an orifice would not meet the symmetry requirement. Accordingly, support stub 126 defines the required constriction 332, which remains in place however fuel bundle 130 is oriented.

Despite the smoothing effects of inversion, different positions within a fuel bundle 301 are exposed to different conditions. The fuel near the top of the bundle 301 undergoes a different history than does the fuel at the bottom. Accordingly, fuel 140 in rods 302 is distributed non-uniformly. For example, more fertile fuel can be located near the top of bundle 301. Fertile fuel at the bottom of bundle 301 is not converted during a first cycle, and does not contribute significantly to power during the second cycle. Bottom fertile fuel is converted during the second cycle and is available during an optional third cycle. However, since further cycles are not anticipated, it is not desirable to generate too much fissile actinide products, since those that do not burn up wind up as long-term radioactive waste.

Mechanically, each fuel rod 302 has a top plenum 342 and a bottom plenum 344 on both sides of fuel 346. These plenums 342 and 344 are designed to accommodate gaseous fission products that escape the fuel. Plenums are incorporated at both ends to provide symmetry in the fuel position for fuel bundle 130. Top plenum 342 houses a spring 348 that helps compact fuel 346 while permitting thermal expansion. Bottom plenum 346 houses a ventilated pedestal 350 that keeps fuel 346 out. Pedestal 350 also opposes the force of spring 348 to maintain compression of fuel 346. The use of a spring in one plenum and a pedestal in the opposing plenum, and the non-uniform distribution of fuel 356 are examples of acceptable asymmetry in fuel assembly 130.

In accordance with the present invention, a fuel management method 400 for reactor 100 involves inverting fuel assemblies between operational cycles. Preparatory steps include assembly of fuel rods and of fuel assembly. During a refueling operation, a fuel assembly is inserted, at step 401, top side up into core 104. Once refueling is complete, reactor 100 is operated, at step 402, for a first cycle. After this cycle and any additional refueling operations and operating cycles not involving inversion of this specific fuel assembly, the reactor is shut down.

During the next refueling operation, the fuel assembly is inverted, at step 403, and replaced in its original position in the core. The present invention also provides for changing the array position of the fuel assembly in accordance with other refueling strategy considerations. A second operational cycle is implemented, at step 404, followed by a respective refueling shutdown.

At this point, there are two major alternatives provided by the present invention. The fuel assembly can be disposed of, branch 410, or it can be inverted again and reinstalled, branch 411. In the latter case, the second inversion, at step 405, restores the original orientation of the fuel assembly. One purpose of this reversion is the burn up of actinide fissile material generated during the second operating cycle. After this inversion, a third operating cycle and shutdown, step 406, is implemented. During a following refueling operation, the fuel assembly is removed and disposed of, step 407. A new fuel assembly is added to the core in its place. Where the reversion is not implemented, steps 405 and 406 are skipped and step 407 follows step 404.

The branches of method 400 can be practiced in the alternative or together with respect to different assemblies in the same core. The election of two versus three cycles depends on core position of a fuel assembly and the distribution of fuel in the bundle. A major consideration is the amount of fissile fuel generated during the second operating cycle.

These and other modifications to and variations upon the described embodiments are provided for by the present invention, the scope of which is limited only by the following claims.

What is claimed is:

1. A fuel management method for a dual-phase nuclear reactor, said method comprising:
   installing a fuel assembly having first and second axial ends so that said first axial end is above said second axial end;
   operating said reactor a first time;
   shutting down said reactor;
   reinstalling said fuel assembly so that its second axial end is above said first axial end;
   operating said reactor a second time;
   shutting down said reactor;
   reinstalling said fuel assembly with said first axial end above said second axial end; and
   operating said reactor a third time.

2. A method as recited in claim 1 further comprising additional steps following said step of operating said reactor a third time, said additional steps comprising:
   shutting down said reactor; and
   disposing of said fuel assembly so that said fuel assembly is installed exactly three times in said reactor.

* * * * *